(12) United States Patent
Kocarev et al.

(10) Patent No.: US 7,106,864 B2
(45) Date of Patent: Sep. 12, 2006

(54) CHAOS-BASED DATA PROTECTION USING TIME-DISCRETE DYNAMICAL SYSTEMS

(75) Inventors: Ljupco Kocarev, San Diego, CA (US); Goce Jakimoski, Tallahassee, FL (US); Gianguido Rizzotto, Agrate Brianza (IT); Paolo Amato, Llmblate (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 776 days.

(21) Appl. No.: 10/319,432

(22) Filed: Dec. 12, 2002

(65) Prior Publication Data

US 2003/0219120 A1   Nov. 27, 2003

(30) Foreign Application Priority Data

Dec. 27, 2001 (EP) ................... 01130846

(51) Int. Cl.
*H04L 9/00* (2006.01)
*H04K 1/00* (2006.01)
*H04L 9/28* (2006.01)

(52) U.S. Cl. ........................ 380/263; 380/28
(58) Field of Classification Search ............... 380/263
See application file for complete search history.

(56) References Cited

U.S. PATENT DOCUMENTS 6,792,111 B1 * 9/2004 Italia et al. ................ 380/263
2003/0007635 A1 * 1/2003 Li et al. ..................... 380/28

OTHER PUBLICATIONS

L. Blum, M. Blum, and M. Shub, "A Simple Unpredictable Pseudo-Random Number Generator", Siam J. Comput. 15, pp. 364-383 (1986).
M. Goetz, K. Kelber, and W. Schwarz, "Discrete-time chaotic encryption systems—Part I: Statistical Design Approach", IEEE Tran. On Circuits and Systems, part 1, 44, pp. 963-970, 1997.
F. Dachselt, K. Kelber, and W. Schwarz, "Discrete-time chaotic encryption systems—Part III: Cryptographical analysis", IEEE Trans. On Circuits and Systems, part 1, 45, pp. 883-888, 1998.
Z. Kotulski and J. Szczepanski, "Discrete chaotic cryptography", Ann. Physik, 6, pp. 381-394 (1997).
Y.H. Chu and S. Chang, "Dynamical cryptography based on synchronized chaotic systems", Electron Lett., 35, pp. 974-975, 1999.
Ljupco Kocarev, et al., "From Chaotic Maps to encryption Schemes", vol. IV pp. 514-517, © 1998 IEEE.
Matthews; "On the Derivation of a "Chaotic" Encryption Algorithm"; Cryptologia; Jan. 1989; pp. 29-42; vol. XIII, No. 1.
Wheeler; "Problems with Chaotic Cryptosystems"; Cryptologia; Jul. 1989; pp. 243-250; vol. XIII, No. 3.
Wheeler, et al. "Supercomputer Investigations of a Chaotic Encryption Algorithm"; Cryptologia; Apr. 1991; pp. 140-152; vol. XV, No. 2.
Lagarias: "Pseudorandom Number Generators in Cryptography and Number Theory"; Proceedings of Symposia in Applied Mathematics; American Mathematical Society; 1990; pp. 115-143; vol. 42.
Habutsu, et al "A Secret Key Cryptosystem by Iterating a Chaotic Map"; Advances in Cryptology—EUROCRYPT'91; 1991; pp. 127-140; Springer-Verlag; Berlin.
Baptista "Cryptography with chaos"; Physics Letters A 240; Elsevier Science B.V.; Mar. 23, 1998; pp. 50-54.
Alvarez, et al. "New approach to chaotic encryption"; Physics Letter A 263; Elsevier Science B.V.; Dec. 6, 1999; pp. 373-375.
Biham; Cryptanalysis of the Chaotic-Map Cryptosystem Suggested at Eurocrypt'91; Advances in Cryptology; Eurocrypt'91; 1991; pp. 532-534; Springer-Verlag; Berlin.
Fridrich; "Symmetric Ciphers Based on Two-Dimensional Chaotic Maps", International Journal of Bifurcation and Chaos, 8, 1998; pp. 1259-1284; http://www.ws.binghamton.edu/fridrich/publications.html.
Kotulski, et al.; "On the application of discrete chaotic dynamical systems to cryptography. DCC method", Biuletyn Wat, Rock XLVIII; NR 10(566)1999; pp. 111-123; http://www.ippt.gov.pl/-zkotulsk/wat.pdf.

* cited by examiner

*Primary Examiner*—Gilberto Barron, Jr.
*Assistant Examiner*—Virgil Herring
(74) *Attorney, Agent, or Firm*—Hogan & Hartson L.L.P.

(57) ABSTRACT

In an encryption/decryption system for converting data signals between an unencrypted plaintext format and an encrypted ciphertext format plurality of round modules are provided permitting a respective set of input data signals (TEXT IN) to generate a respective set of output data signals (TEXT OUT) by means of transformation controlled by a round key (SUBKEY). The transformation is identified by at least one map function derived from a chaotic map.

21 Claims, 2 Drawing Sheets

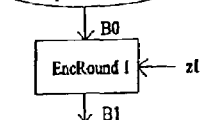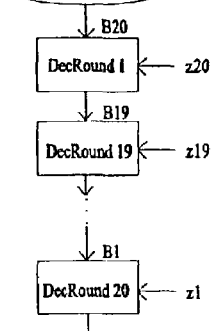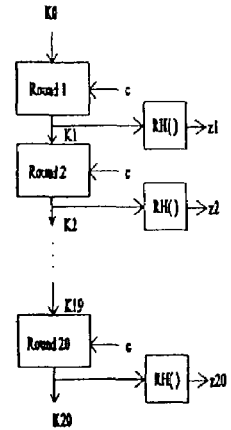
Figure 1     Figure 2     Figure 3
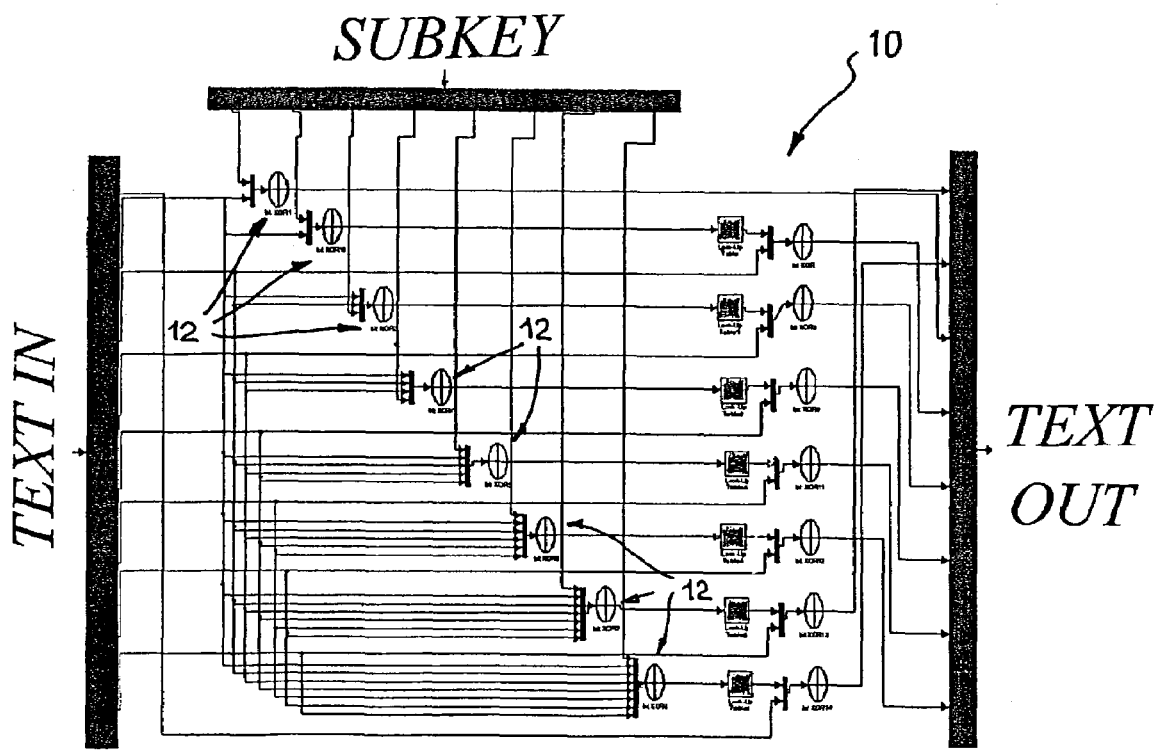
Figure 4

CHAOS-BASED DATA PROTECTION USING TIME-DISCRETE DYNAMICAL SYSTEMS

FIELD OF THE INVENTION

The present invention relates to cryptology techniques used to protect electronic information in communication systems and computer networks.

BACKGROUND OF THE INVENTION

Communication and computer networks (as parts of an information system) are vulnerable to attacks by hackers and malicious insiders as witnessed e.g. by electronic fraud, eavesdropping, computer viruses, and malicious applets. As our society depends more and more in a critical way on electronic information (electronic commerce, Electronic Data Interchange, intranets, electronic payments, electronic voting), more research is required to develop techniques to protect this information. Cryptology places a central role in all these solutions.

With the current state of the art in cryptology, it is not always possible to have provably secure solutions, although there is a trend to provide more and more security properties of cryptographic objects. A different approach to the problem of security is to show that a cryptographic object is resistant to various kinds of known attacks.

In the last decade, interest has been growing in the use of chaos for spread-spectrum communications and cryptography. All algorithms for cryptography proposed to date and based on chaos properties have a serious drawback in that security of the algorithms is not properly addressed. Security in cryptography means "randomness increasing" and "computationally unpredictable" behavior of the algorithm. Usual requirements for "statistical security" (used for Monte Carlo simulations) such as uniform distribution and independence from the plaintext (information) are only necessary conditions for cryptographic security.

L. Blum, M. Blum, and M. Shub, "A Simple Unpredictable Pseudo-Random Number Generator", SIAM J. Comp. 15, pp. 364–83 (1986) considered two examples that both produce long well-distributed sequences of numbers (uniformly distributed and independent on the initial condition) and both have computationally hard problems at their core, but one of them is completely predictable (and therefore of no use in cryptography) and another is unpredictable.

In the following we briefly discuss some of the work on chaos based cryptography done in the last decade.

In papers such as R. A. J. Matthews, "On the Derivation of a 'Chaotic' Encryption Algorithm", Cryptologia, vol. 13, pp. 29–42, 1989; D. D. Wheeler, "Problems with Chaotic Cryptosystems", Cryptologia, vol. 13, pp. 243–50, 1989; and D. D. Wheeler and R. A. J. Matthews, "Supercomputer Investigations of a Chaotic Encryption Algorithm", Cryptologia, vol. 15, no. 2, pp. 140–52, April 1991, the authors propose a chaos derived pseudo-random number generator (PRNG).

They numerically observe that the average cycle and transient lengths grow exponentially with the precision of implementation, and from this fact they deduce that by using high-precision arithmetics one can obtain PRNGs which are still of cryptographic interest.

The statistical tests applied to PRNGs for use in Monte Carlo simulations are generally simple; for cryptographic applications, PRNGs must pass far more stringent statistical tests as discussed e.g. in J. C. Largaris, "Pseudo-Random Number Generators in Number Theory and Cryptography", in Cryptology and Computational Number Theory, C. Pomerance, ed., Proc. Symp. Appl. Math., 42, pp. 115–43 (1990). However, the authors of the captioned articles on PRNG do not address this question at all.

In a series of papers such as M. Goetz, K. Kelber, and W. Schwarz, "Discrete-time chaotic encryption systems—Part I: Statistical Design Approach", IEEE Tran. On Circuits and Systems, part 1, 44, pp. 963–70,1997; F. Dachselt, K. Kelber, and W. Schwarz, "Discrete-time chaotic encryption systems—Part III: Cryptographical analysis", IEEE Trans. On Circuits and Systems, part I, 45, pp. 883–88, 1998, chaotic cryptography is proposed.

By chaotic cryptography a continuous-value approach to the encryption problem is meant involving a discrete-value realization by means of floating-point or fixed-point arithmetics.

At the theoretical level, cryptography can be analyzed in two different ways: assuming that the underlying models of computation are Turing machines (see e.g. J. Hopcroft and J. Ullman, Formal Languages and Their Relations to Automata, Addison-Wesley, Reading, Mass., 1981) or real numbers (see e.g. L. Blum, F. Cucker, M. Shub and S. Smale, Complexity and real computation, Springer-Verlag, N.Y., 1998).

While the former approach (using Turing machines) has led to a notion of "secure cryptography" or "provable security", no work in cryptography that assume real-numbers model of computation is known.

Also, the notion of security in several of the papers considered in the foregoing has only "statistical meaning" and includes two requirements: the probability distribution of the encoded signal is independent of the probability distribution of the information signal, and the probability distribution of the encoded signal is uniform.

At the practical level all cryptographical models are defined on finite sets. One of the goals in cryptography is to design good cryptographic algorithms using the smallest possible values of cardinality for these finite sets. However, discrete-value realization by means of floating-point (or fixed-point) arithmetics implies using a large finite set.

As indicated, chaos has already been used to design cryptographic systems. An encryption algorithm that uses the iterations of the chaotic tent map is proposed in T. Habutsu, Y. Nishio, I. Sasase, and S. Mori, "A Secret Key Cryptosystem by Iterating a Chaotic Map", Advances in Cryptology—EUROCRYPT'91, pp. 127–40, Springer-Verlag, Berlin, 1991, and then generalized in Z. Kotulski and J. Szczepanski, "Discrete chaotic cryptography", Ann. Physik, 6, pp. 381–94 (1997).

Encryption algorithms based on multiple iteration of a certain dynamical chaotic system coming from gas dynamics models are presented in Z. Kotulski J. Szczepanski, K. Grski, A. Paszkiewicz and A. Zugaj, "Application of Discrete Chaotic Dynamical Systems in Cryptography—DCC Method", Internat'l Journ. of Bifurcation and Chaos, 9, pp. 1121–35 (1999).

In J. Fridrich, "Symmetric Ciphers Based on Two-Dimensional Chaotic Maps", International Journal of Bifurcation and Chaos, 8, pp. 1259–84 (1998) methods are shown how to adapt invertible two-dimensional chaotic maps on a torus or on a square to create new symmetric block encryption schemes.

In M. S. Baptista, "Cryptography with chaos", Phys. Lett A, 240, pp.50–54, 1998, the author encrypts each character of the message as the integer number of iterations performed in the logistic equation. While in conventional cryptographic ciphers the number of rounds (iterations) performed by an encryption transformation is usually less then 30 (e.g. DES usually requires 20 rounds), in the last-captioned paper this number can be as large as 65536, and is always larger than 250.

Another encryption algorithm based on synchronized chaotic systems is proposed in Y. H. Chu and S. Chang, "Dynamical cryptography based on synchronized chaotic systems", Electron Lett., 35, pp. 974–75, 1999. The authors suggest each byte of a message be caused to correspond (to be encrypted) with a different chaotic attractor.

In E. Alvarez, A. Fernandez, P. Garcia, J. Jimenez, A. Marcano, "New approach to chaotic encryption", Phys. Lett A, 263, pp. 373–75,1999, the authors assume that the message to be sent is a binary file consisting of a chain of 0's and 1's and the sender and the receiver has previously agreed to use the same d- dimensional chaotic dynamical rule, which generates sequences of real numbers by iterating it.

A common attribute to all chaos-based block encryption algorithms is that their security is not analyzed in terms of the techniques developed in cryptanalysis. For example, the encryption algorithm proposed in the paper by Habutsu et al. referred to in the foregoing is cryptanalysed in E. Biham, "Cryptanalysis of the Chaotic-Map Cryptosystem Suggested at EUROCRYPT '91", Advances in Cryptology—EUROCRYPT '91, pp. 532–34, Springer-Verlag, Berlin, 1991, showing that the algorithm can be broken using known-plaintext attack.

In fact, analysis of performance and security of chaos based encryption schemes proposed in the papers by Baptista, Chu et al., and Alvarez et al. cited in the foregoing shows that the encryption rates these algorithms offer are not competitive with the encryption rates of standard cryptographic algorithms, and, furthermore, these algorithms can be easily broken using known-plaintext attacks.

SUMMARY OF THE INVENTION

The object of the invention is a block encryption cipher on a dedicated (modular) architecture adapted to overcome the drawbacks of the prior art documents considered in the foregoing while being at the same time more secure and more efficient (i.e. its computational complexity is lower) than standard block cipher (like DES).

The invention, having the features called for in the annexed claims, is based on a novel chaos-based secure block encryption algorithm. The architecture of the invention is adapted to be implemented by means of devices which can be easily integrated in hardware, and therefore may have vast applications (an example is using this cipher in smart-cards).

Specifically, the invention involves a encryption/decryption method, a respective system and computer program product adopted to carry out the method of the invention.

As indicated, the invention relates to an architecture of a block encryption cipher based on a novel chaos-based secure block encryption algorithm, where the basic properties characterizing a secure object are "randomness increasing" and "computationally unpredictable". By object a pseudo-random number generator, one-way function, or block encryption algorithm is meant. It is well known that if one of the following objects exists: a secure pseudo-random number generator, a secure one-way function, and a secure block encryption algorithm, then all these objects exist.

The invention proposes a class of block encryption ciphers based on chaos, preferably using two well-known chaotic maps: exponential and logistic. The ciphers use only byte operations that can be easily implemented on various processors and in hardware. As a result of extensive cryptanalys it may be conjectured that no other efficient attacks than brute force exists for the ciphers of the invention.

BRIEF DESCRIPTION OF THE DRAWINGS

The invention will now be described, by way of example only, with reference to the enclosed drawings wherein:

FIG. 1 is a block diagram of an encryption transformation,

FIG. 2 is a block diagram of a decryption transformation,

FIG. 3 is a block diagram of key generation,

FIG. 4 shows the general architecture of a round module for use in encryption according to the present invention.

DETAILED DESCRIPTION

Block Encryption Algorithms

Figure 5:
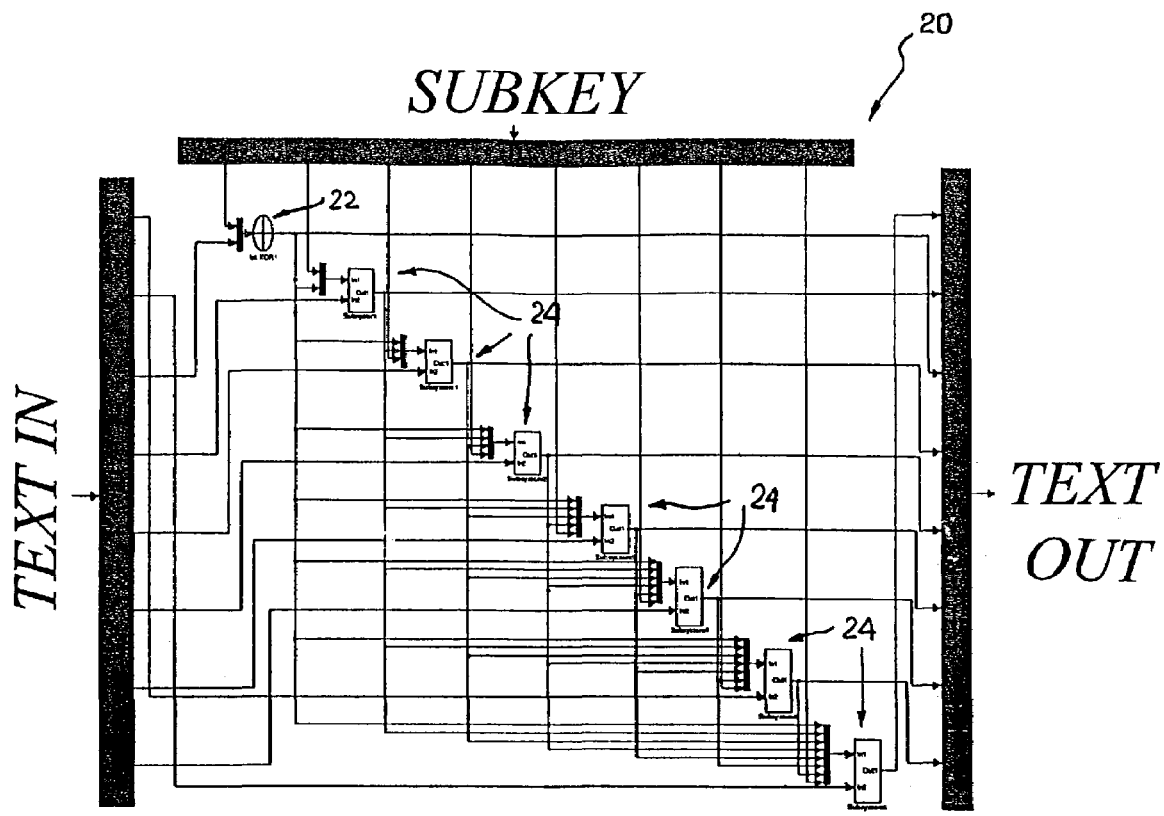
FIG. 5 shows the general architecture of a round module for use in decryption according to the present invention.

Let $B_0$ be a plaintext block of length 64 bits (L=8 bytes). Here $X_{i,0} \ldots X_{i,7}$ stand for the eight bytes of the block $B_i$, i.e. $B_i = X_{i,0} \ldots X_{i,7}$. The ciphering process consists of r rounds of identical transformations applied in a sequence to the plaintext block.

The encryption transformation is given by:

$$x_{i,k+1} = x_{i-1,k} \oplus f_{k-1}[x_{i-1,1}, \ldots, x_{i-1,k-1}, z_{i-1,k-1}], \quad (1)$$

where $i=1, \ldots, r$, $k=1, \ldots, 8$, $f_0 = z_{i,0}$, $x_8 \equiv x_0$ and $x_9 \equiv x_1$, and $z_{i,0} z_{i,7}$ are the eight bytes of the subkey $z_i$ which controls the i-th round. The functions $f_1, \ldots, f_7$ have the following form $$f_j = f(x_1 \oplus x_2 \oplus \ldots x_j \oplus z_j)$$

where $j=1, \ldots, 7$, and $f:M?M, M=\{0, \ldots, 255\}$ is a map derived from a chaotic map. The output block $B_i = x_{i,0}, \ldots, x_{i,7}$ is input in the next round, except in the last round.

Therefore, $B_r = x_{r,0}, \ldots, x_{r,7}$ is the ciphertext block (encrypted information). The length of the ciphertext block is 64 bits (8 bytes) and is equal to the length of the plaintext block.

Each round i is controlled by one 8 byte subkey $z_i$. The total number of subkeys is r and they are derived from the key in a procedure for generating round subkeys. In all the examples considered below, f is obtained via discretization of a nonlinear map, with mixing property and robust chaos.

Two simple chaotic maps may be chosen as examples:

exponential $x' = a^x \pmod 1$ and quadratic (logistic) $x' = 4x(1-x)$.

The decrypting structure "undoes" the transformations of the encrypting structure: r decrypting rounds are applied to the ciphertext block $B_r$ to produce the original plaintext block $B_0$. The round subkeys are applied in a reverse order. The decryption round transformation is:

$$x_{i-1,k} = x_{i,k+1} \oplus f_{k-1}[x_{i-1,1}, \ldots, x_{i-1,k-1}, z_{i-1,k-1}], \quad (2)$$

with $k=1, \ldots, 8$, $f_0 = z_0$, $x_8 \equiv x_0$ and $x_9 \equiv x_1$.

In the first example the function f is obtained in two steps: the output range of the exponential function is first extended to the interval [0,256] and then discretized. The value for a is chosen so that it is a natural number and a generator of the multiplicative group of nonzero elements of the Galois field of order 257. There are 128 different values of a. In this case the map performs one-to-one transformation.

In the above example with exponential function, the discrete map is a bijection because the value chosen for a is a primitive element of the Galois field. In the second example the one-to-one map is determined using a discretization procedure that is different from the one used in the first example. The procedure is as follows:

Divide the phase space into n+1 equal volume regions. Assign the numbers 0, . . . , n to the regions so that one number is assigned to exactly one region. If a point is in the region i its magnitude is defined ad i.

Randomly choose one starting point from each region and determine its image after N iterations of a chaotic map.

Find the set S of starting points that have a unique image. Choose a subset A that contains 256 elements of S and determine the set B of corresponding images.

Assign new magnitudes 0, . . . , 255 to the elements of A according to their old magnitudes. Do the same with the elements of B. If the new magnitude of the starting point in A is i and the new magnitude of its image is j, then we say that f(i)=j. The map f is one-to-one.

Table 1 shows a function constructed using the previously described procedure. The numbering system used is hexadecimal. The chaotic map, which was used in step 2, is the logistic map. N=1000 and n=767. The cardinality of the set S is 259.

Cryptanalysis

Cryptographic security of a cryptographic object (for example, a block encryption algorithm) can be checked up by means of proving its resistance to various kind of known attacks. Exemplary of two basic attacks are differential cryptanalysis (see e.g. E. Biham, and A. Shamir, "Differential Cryptanalysis of DES-like Cryptosystems", Advances in Cryptology—CRYPTO'90, pp. 2–21, Springer-Verlag, Berlin, 1991; "Differential Cryptanalysis of FEAL and N-Hash", Advances in Cryptology—EUROCRYPT '91, pp. 1–16, Springer-Verlag, Berlin, 1991; "Differential Cryptanalysis of the Full 16—round DES", in Advances in Cryptology—CRYPTO'92, Springer-Verlag, Berlin, 1993) and linear cryptanalysis (see e.g. M. Matsui, "Linear Cryptanalysis method for DES ciphers", Advances in Cryptology—EUROCRYPT'93, pp. 386–397, Springer-Verlag, Berlin, 1994).

Differential Cryptanalysis

Differential cryptanalysis is a chosen-plaintext attack to find the secret key of an iterated cipher. It analyzes the effect

TABLE 1

|   | 0  | 1  | 2  | 3  | 4  | 5  | 6  | 7  | 8  | 9  | a  | b  | c  | d  | e  | f  |
|---|----|----|----|----|----|----|----|----|----|----|----|----|----|----|----|----|
| 0 | 60 | c4 | 56 | 52 | 88 | 17 | 82 | ac | 28 | 96 | 4f | 4a | ff | 20 | b5 | 6a |
| 1 | 92 | 83 | bc | a7 | b2 | 9a | ee | 70 | 35 | e1 | 25 | 61 | 9d | a4 | 9c | 47 |
| 2 | b7 | 7d | 2f | 24 | c7 | 7e | c5 | c8 | 77 | 14 | 8d | cc | fd | 8a | ef | 36 |
| 3 | 76 | 2c | 12 | 11 | 2a | 29 | a8 | b8 | 22 | 84 | c3 | e9 | e6 | e2 | 15 | 57 |
| 4 | e0 | 3c | 69 | ce | 05 | d4 | cd | fa | 30 | f8 | dd | 75 | cf | a0 | 0c | 55 |
| 5 | 9f | 41 | f3 | 6f | ea | d2 | a2 | 65 | 23 | 89 | 81 | 39 | e4 | 93 | ba | 6b |
| 6 | a9 | b0 | 1f | f7 | 34 | 43 | 1b | 08 | 04 | fc | 0b | aa | 73 | 94 | eb | 8e |
| 7 | c2 | d6 | 53 | 48 | 18 | 27 | 8f | 5b | 5d | d0 | ec | f4 | f5 | 31 | 4b | ab |
| 8 | 4e | 97 | 79 | bb | 13 | b6 | 5e | 8b | 10 | 50 | 49 | 1d | f6 | 99 | 00 | 68 |
| 9 | 3f | 95 | ad | e7 | e8 | 87 | 8c | 51 | 64 | 1e | d9 | e5 | 5a | da | de | f0 |
| a | 0f | 46 | f1 | 1c | 71 | e3 | 09 | a5 | dc | 9e | bf | 40 | 80 | 3b | 45 | 02 |
| b | a6 | 42 | d1 | ed | d7 | fe | 16 | 9b | 63 | 72 | c0 | 78 | b4 | 67 | 26 | 03 |
| c | 01 | 54 | 07 | 90 | 38 | 21 | 62 | 3d | d8 | ca | 7f | b1 | 0a | d5 | 44 | a1 |
| d | 0d | c9 | f2 | 2e | b9 | 59 | 6c | 66 | b3 | 74 | 32 | bd | df | 58 | 6d | 37 |
| e | 3a | 2d | db | 6e | f9 | 1a | c6 | 06 | 5f | a3 | 2b | 19 | 7c | fb | 7b | af |
| f | be | 0e | 85 | 5c | 33 | 7a | c1 | 4d | cb | 86 | 91 | 4c | d3 | ae | 3e | 98 |

The algorithm of the invention is a block cipher algorithm. It encrypts data in e.g. 64-bit blocks. The key length is e.g. 128 bits, and all the security rests with the key.

The fundamental building block of the algorithm is a single application of the transformation (1), i.e. the building block designated a round. The preferred algorithm has 12 rounds; i.e., it applies the same combination of techniques on the plaintext block 12 times.

FIGS. 1, 2 and 3 schematically represent the outline of the algorithm for encrypton, decryption and key generation module. In FIG. 1, these rounds provide for keys $z_1, z_2, \ldots z_{20}$ being applied to lead from a plaintext B0 to a ciphertext B20.

In FIG. 2 these keys, applied in reverse order (i.e. $z_{20}$, $z_{19}, \ldots z_1$) lead from ciphertext B20 to plaintext B0. FIG. 3 shows how keys $z_1, z_2, \ldots z_{20}$ are generated for the various rounds 1 to 20.

Since in each round the algorithm applies the same combination of techniques, the most important part of the architecture is the hardware module implementing this combination. From now on, this will be referred to as the round module. The round modules for encryption, decryption and key generation will be described in detail in the following.

of the "difference" of a pair of plaintexts on the "difference" of succeeding round outputs in an r-round iterated cipher.

An i-round differential is a couple $(\alpha, \beta)$, where $\alpha$ is the difference of a pair of distinct plaintexts $B_0$ and $B_0^*$ and where $\beta$ is a possible difference for the resulting i-th outputs $B_1$ and $B_1^*$. The probability of an i-round differential $(\alpha, \beta)$ is the conditional probability that $\beta$ is the difference $\Delta B_1$ of the ciphertext pair after i rounds given that the plaintext pair has difference $\Delta B_0 = \alpha$ when the plaintexts and the round subkeys are independent and uniformly distributed.

The basic procedure of a differential attack on a r-round iterated cipher can be summarized as follows:

Find the (r–1)-round differential $(\alpha, \beta)$ such that its probability is maximum, or nearly maximum.

Choose a plaintext $B_0$ uniformly at random and compute $B_0^*$ so that the difference $\Delta B_0$ is $\alpha$. Submit $B_0$ and $B_0^*$ for encryption under the actual key. From the resultant cipher-texts $B_r$ and $B_r^*$, find every possible value (if any) of the last-round subkey $z_r$ corresponding to the anticipated difference $\beta$. Add one to the count of the number of appearances of each such value of the last-round subkey.

Repeat step 1 and step 2 until some values of $z_r$ are counted significantly more often than others. Take this most-often-counted subkey, or this small set of such subkeys, as the cryptanalyst's decision for the actual subkey $z_r$.

Usually the most difficult step in the attack procedure described above is the first step. When searching for the (r–1)-round differential with maximum or nearly maximum probability, the attacker exploits some "weakness" of the non-linear transformations used in the cipher. Thus the non-linear maps should be chosen to have differential uniformity. The differential approximation probability of a given map f ($DP_f$ for short) is a measure for differential uniformity and is defined as $$DP_f = \max_{\Delta x \neq 0, \Delta y} \left( \frac{\#\{x \in X | f(x) \oplus f(x \oplus \Delta x) = \Delta y\}}{2^n} \right) \quad (3)$$

where X is the set of all possible input values and $2^n$ the number of its elements. Actually, $DP_f$ is the maximum probability of having output difference $\Delta y$, when the input difference is $\Delta x$.

Linear Cryptanalysis

Linear cryptanalysis exploits the weakness of a cipher expressed in terms of "linear expressions". By adopting the same terminology of the work by Matsui referred to in the foregoing, a linear expression for one round is an "equation" for a certain modulo two sum of round input bits and round output bits as a sum of round key bits. The expression should be satisfied with probability much more (or much less) than 0.5 to be useful.

An I/O sum $S^{(i)}$ for the i-th round is a modulo-two sum of a balanced binary-valued function $f_i$ of the round input $B_{i-1}$ and a balanced binary-valued function $g_i$ of the round output $B_i$ that is, $$S^{(i)} := f_i(B_{i-1}) \oplus g_i(B_i) \quad (4)$$

where $\oplus$=XOR denotes modulo-two addition and a balanced binary-valued function is defined as a function that takes on the value 0 for exactly half of its arguments and the value 1 otherwise.

I/O sums for successive rounds are linked if the output function $g_{i-1}$ of each round before the last coincides with the input function $f_i$ of the following round. When p successive $S^{(i)}$ are linked, their sum, $$S^{(1, \cdots, p)} := \oplus S^{(i)} = g_0(B_0) \oplus g_p(B_p) \quad (5)$$

is called a multi-round I/O sum.

The umbalance I(V) of a binary-valued variable V is the nonnegative real number $|2P[V=0]-1|$. The umbalance is used as a measure for the "effectiveness" of an I/O sum. The average-key umbalance of the I/O sum $S^{(1, \cdots, p)}$ is the expectation of the key dependent umbalances $I(S^{(1, \cdots, p)}| z^{(1, \cdots, p)})$ and is denoted as $I(S(1, \ldots, r))$. An I/O sum is effective if it has a large average-key imbalance and is guaranteed if its average-key imbalance is 1.

Assuming that the attacker has access to N plaintext/ciphertext pairs with uniformly randomly chosen plaintexts the basic procedure is as follows.

1. Find an effective I/O sum $S^{(1, \cdots, r-1)}$.
2. Set up a counter $c[z_r]$ for each possible last-round key $z_r$ and initialise all counters to zero.
3. Choose a plaintext pair ($B_0, B_r$).
4. For each possible value $z_r$, evaluate $B_{r-1} = E_{zr}^{-1}(B_r)$ and if $g_0(B_0) \oplus g_{r-1}(B_{r-1}) = 0$, increment $c[z_r]$ by 1.
5. Repeat steps 3 and 4 for all N available plaintext/ciphertext pairs.
6. Output all keys $z_r$ that maximize $|c[z_r]-N/2|$ as candidates for the key actually used in the last round.

As in the differential cryptanalysis attack, the first step in this procedure is the most difficult one. The existence of an effective I/O sum depends on the characteristics of the non-linear maps used in the cipher. The most commonly used characteristic, when talking about linear cryptanalysis, is the linear approximation probability ($LP_f$ for short) and it is defined as $$LP_f = \max_{a, b \neq 0} \left( \frac{\#\{x \in X | x \cdot a = f(x) \cdot b\} - 2^{n-1}}{2^{n-1}} \right)^2 \quad (6)$$

where a?b denotes the parity of bit-wise product of a and b, X is the set of all possible inputs and $2^n$ the number of its elements. The linear approximation probability is square of the maximal imbalance of the event: the parity of the input bits selected by the mask a is equal to the parity of the output bits selected by the mask b. Decreasing the $LP_f$ yields to increasing the complexity of the linear cryptanalysis attack.

Properties of the Block Encryption Cipher of the Invention

The number of rounds in the algorithm is selected according to the following Theorem: Every IOth-round characteristic of the encryption cipher (1) consists of at least 16 active S-boxes.

The proof of this theorem is based on the following lemmas.

Lemma 1. If the differential characteristic of the proposed algorithm has zero active S-boxes in the i-th round, then the number of active S-boxes in the (i+l)-th round (if this round exists) is 7.

Proof. If there are no active S-boxes in the i-th round, then the following relations must hold:

$$\Delta x_{i-1,1} = 0$$
$$\Delta x_{i-1,1} \oplus \Delta x_{i-1,2} = 0$$
$$\ldots = \ldots$$
$$\Delta x_{i-1,1} \oplus \Delta x_{i-1,2} \oplus \ldots \oplus \Delta x_{i-1,7} = 0.$$

Thus $\Delta x_{i-1,1} \oplus \Delta x_{i-1,2} \oplus \ldots \oplus \Delta x_{i-1,7}=0$, and the only possible one-round differential characteristic with zero active S-boxes is $(\Delta x_{i-1,0} = \Delta \neq 0, 0, 0, 0, 0, 0, 0, 0)$ ? $(0, \Delta, 0, 0, 0, 0, 0, 0)$. $\Delta_{i,1}$ is input of all S-boxes in the (i+l)-th round. Hence, the number of active S-boxes in the (i+l)-th round must be 7.

Definition Given n-round differential characteristic C we call the n-tuple $(a_1, a_2, \ldots, a_n)$ the distribution of the active S-boxes of the characteristic C if $a_i$ is the number of the active S-boxes in the i-th round of the characteristic C. We write Active(C)=$(a_1, a_2, \ldots, a_n)$. We denote the number of active S-boxes of the characteristic C by $\sigma(C) = \Sigma^n_1 a_i$.

We can now restate Lemma 1 as: Every zero element of the distribution of the characteristic C is followed by 7 (if there is a next element).

Lemma 2. Every 3-round characteristic C of the proposed algorithm has at least 2 active S-boxes, i.e., σ(C)≧0.

Proof. We suppose that there is 3-round characteristic that has less then 2 active S-boxes. There are four possible combinations: Active(C)=(1,0,0), Active(C)=(0,1,0), Active(C)=(0,0,1), and Active(C)=(0,0,0). According to Lemma 1 none of this case is possible. Thus, there is no 3-round characteristic C such that σ(C)<2.

Lemma 3. Every characteristic C with at least four rounds that has 1 active S-box in the first round and has less then 3 active S-boxes in the second round contains at least 9 active S-boxes in the first four rounds.

Proof. We denote the input bytes in the i-th round of the characteristic C by $x_{i,0}, \ldots, x_{i,7}$ and the output bytes by $x_{i+1,0}, \ldots, x_{i+1,7}$. The only possible case when we have one active S-box in the first round is:

$$\Delta x_{1,1} \oplus \Delta x_{1,2} = \Delta, \Delta_{1,j} = 0, j = 3,4,5,6,7$$
$$\Delta x_{1,2} \oplus \Delta x_{1,3} = \Delta, \Delta_{1,j} = 0, j = 1,4,5,6,7$$
$$\ldots = \ldots$$
$$\Delta x_{1,6} \oplus \Delta x_{1,7} = \Delta, \Delta_{1,j} = 0, j = 1,2,3,4,5$$
$$\Delta x_{1,7} = \Delta, \Delta_{1,j} = 0, j = 1,2,3,4,5,6,$$

where Δ=≠0. It can be easily checked that the only possible cases when we have one active S-box in the first round and less than 3 active S-boxes in the second round is $$\Delta x_{1,5} \oplus \Delta x_{1,6} = \Delta, \Delta_{1,j} = 0, j=1,2,3,4,7$$

$$\Delta x_{1,6} \oplus \Delta x_{1,7} = \Delta, \Delta_{1,j} = 0, j=1,2,3,4,5.$$

This is due to the fact that if $\Delta_{1,j}=\Delta_{1,j+1}=\Delta$, then $\Delta x_{2,j+1}=\Delta$, $\Delta x_{2,j+2}=\Delta_1 \neq \Delta$ and $\Delta x_{2,j+1} \oplus \Delta x_{2,j+2}=\Delta \oplus \Delta_1 \neq 0$. The nonzero difference $\Delta x_{2,j+1} \oplus \Delta x_{2,j+2}$ will activate all S-boxes that have as an input $x_{2,j+2}$. By trying all possible cases when the last two equations are satisfied it can be found out that the best 4-round characteristic has distribution (1,1,0,7).

Proof of the Theorem. Suppose we have 10-round characteristic C with active S-boxes in every round. In that case we have σ(C)=20. If we want to reduce σ(C) there must be a round with 1 or 0 active S-boxes. From Lemma 1 it follows that the only possible way to reduce σ(C) by having round with no active S-boxes is when this round is the last round. In this case, σ(C)=18. From Lemma 3 it follows that the only way to reduce σ(C) by having round with only one active S-box is if this round is one of the last three rounds. In the best case the distribution of the characteristic will be Active (C)=(2,2,2,2,2,2,2,1,1,0) and σ(C)=16.

The differential approximation probability of the function f is $2^{-5} < DP_f = 12/256 < 2^{-4}$ and the linear approximation probability is $LP_f = 2^{-4}$. Thus, the linear approximation probability of any 10-round characteristic is not greater than $LP_f^{16} = 2^{-64}$ and the linear cryptanalysis attack is impossible. Furthermore, the probability of any 10-round differential characteristic would be $(12/256)^{16} \approx 2^{-70}$. Thus, the differential cryptanalysis is also impossible.

The present invention provides a procedure for designing block encryption algorithms using chaotic maps.

Specifically, a block encryption algorithm is designed using a map defined by formula (1) in the foregoing. The block length is e.g. 64 bits, and the key length is e.g. 128 bits. The number of encryption rounds is e.g. 12, such a number being regarded as the one necessary to ensure algorithm security. Those skilled in the art will promptly appreciate that 12 does indeed represent a small number of rounds.

In more general terms the number of rounds may be varied at will.

A procedure for discretization of one dimensional maps is considered. This procedure is general and can be applied to an arbitrary one-dimensional map. Methods for generating S-boxes using chaotic maps are suggested. The derived S-boxes have low differential and linear approximation probability.

Every encryption round is controlled by a round key. The round keys are generated from a e.g. 128-bit key in a key scheduling procedure. The structure of the key scheduling procedure is similar to the structure of the encryption algorithm. Thus, every round key depends on the 128-bit key in a complicated manner and disables related-key attacks.

The mapping expressed by (1) above and the low linear and differential approximation probabilities of the S-box guarantee that there are not good iterative characteristics which can be exploited for differential or linear cryptanalysis.

The decryption algorithm is different from the encryption algorithm and it consists of 12 decryption rounds. The decryption rounds "undo" the encryption rounds by using operations inverse to the operations used in the encryption rounds. The round keys are used in a reverse order during decryption.

Conventional cryptanalysis allows an attacker to control both the plain-text and the ciphertext inputs into the cipher. Since the structure of the key generation, procedure is similar to the encryption structure, the attacker may control also the key schedule. This attack is known as related-key attack; the ciphers of the invention appear to be resistant to such attacks. Therefore, it may be conjected that no other attack than brute force may exist for the solution of the invention.

The three fundamental modules of our architecture are the encryption round module (ERM), the decryption round module (DRM) and the key generation module (KGM). The global architecture is obtained by combining these modules in a suitable way.

The cipher consists of r rounds of encryption transformation according to (1) above applied in a sequence to the plaintext block. In each round, the encryption round module takes as input a 64 bits block of text and 64 bits subkey and produce as output a 64 bits block of ciphertext.

FIG. 4 represents the architecture of the encryption round module (ERM). The elements in the ERM belong to two types. One type is the bitXOR (⊕). The bitXOR elements, designated 12, perform the XOR operation bit-by-bit of the input strings. The other elements are lookup tables 14 implementing the function f described in the foregoing.

Finally, reference numerals 16 designate XOR output gates. The decrypting structure undoes the transformations of the encrypting structure: r decrypting rounds are applied to the ciphertext block $B_r$ to produce the original plaintext block $B_0$. The round subkeys are applied now in a reverse order.

Figure 6:
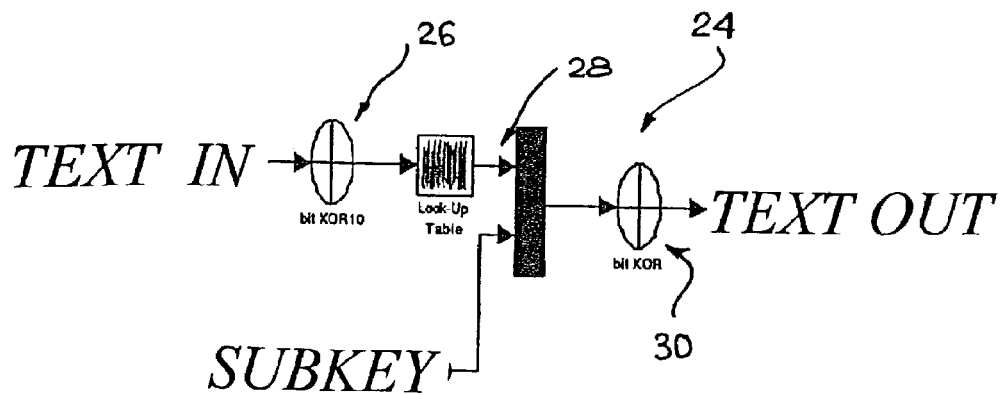
FIG. 6 shows an architecture for a decryption submodule for use in the invention.

In the decryption round module (DRM), designated 20 overall in FIG. 5, reference 22 designates an XOR operator while submodules indicated as 24 correspond to the set of elements shown in FIG. 6.

In FIG. 6 the architecture of each submodule 24 for decryption is shown, where reference numerals 26, 28 and 30 designate an XOR operator, a look-up table (as exemplified e.g. in table 1 above) which is addressed as a function of the subkey signal, and another XOR operator, respectively.

The decryption round module 20 takes as input a 64 bits block of text and 64 bits subkey and produce as output a 64 bits block of plaintext.

The key schedule is the means by which the key bits are turned into round keys that the cipher can use. The mapping performed in each round i depends on the value of the round subkey $z_i$. The length of the round subkeys is 64 bits and they are derived from the 128-bit key $K_0$ in a procedure as follows. The bytes of the keys $K_i$ are denoted by $K_{i,j}$, j= 0, . . . , 15. The key generation procedure is given with:

$$K_{i,k+1} = K_{i-1,k} \oplus f_{k-1}[K_{i-1,1}, \ldots, K_{i-1,k-1}, c_{k-1}],$$

$$z_i = RH(K_i) \qquad (7)$$

where i=1, . . . , r, k=1, . . . , 16, $f_0 = c_0$, $K_{i,16} \equiv K_{i,0}$ and $K_{i,17} \equiv K_{i,1}$.

$c_0, \ldots c_{15}$ are sixteen bytes of the constant c. The function RH assigns the 64-bit right half of the key $K_i$ to the round subkey $z_i$.

The structure of the key generation procedure is similar to the encryption structure. The only difference is that the length of the block is 128 bits and the round subkeys are equal to the constant c.

The value of the constant is c=45f83fd1e01a638099c1d2f74ae61d04$_h$ and it is randomly chosen.

Of course, the basic principle of the invention remaining the same, the embodiments and details of implementation may widely vary with respect to what has been described in the foregoing without departing from the scope of the invention as defined by the annexed claims. Specifically, those skilled in the art will promptly appreciate that the invention can be carried out by resorting both to dedicated hardware and to a general purpose computer/processor (such as a DSP) suitably programmed by loading therein a computer program product according to the invention. In any case implementation of the solution of the invention can be easily accomplished. In fact the building blocks are just two, i.e. a lookup table (which is the same for all operations, while other methods such as DES involve the use of several such tables) and an XOR logical operator.

Both of them represent cheap, very efficient standard components. Also, the solution of the invention involves the use of less complex round modules with respect to e.g. the DES round module and requires a lower number of rounds (e.g. 12 for the present invention against 16 for DES).

The invention claimed is:

1. A method of converting data signals between an unencrypted plaintext format and an encrypted ciphertext format, the method comprising a plurality of rounds effected on a respective set of input data signals to generate a respective set of output data signals by means of a transformation controlled by a round key, wherein said transformation is identified by means of at least one map function derived from a chaotic map and wherein said at least one map function comprises a discrete map.

2. The method of claim 1, wherein said plurality of rounds comprises one last round, and in that the respective set of output data signals of one round are input as a set of respective input data signals to the next round, with the exception of said last round.

3. The method of claim 1, wherein said chaotic map is selected from the group consisting of a quadratic/logistic map and an exponential map.

4. The method of claim 1 wherein said respective input data signals and said respective output data signals are arranged in blocks.

5. The method of claim 4 wherein said blocks of respective input data and respective output data include 64 bits.

6. The method of claim 1 wherein said round key is arranged as a block of data.

7. The method of claim 6, wherein said round key is derived by an encryption/decryption key.

8. The method of claim 7, wherein said encryption/decryption key comprises a length of 128 bits.

9. The method of claim 1 wherein said round key is applied according to a given sequence.

10. The method of claim 1, wherein said round key is applied in a given order when converting said data signals from said unencrypted plaintext format to said encrypted ciphertext format and in a second order, reversed with respect to said first order, when converting said data signals from said encrypted ciphertext format to said unencrypted plaintext format.

11. The method of claim 1 wherein converting said data signals from said unencrypted plaintext format to said encrypted ciphertext format said transformation comprises:

$$x_{i,k+1} = x_{i-1,k} \oplus f_{k-1}[x_{i-1,1}, \ldots, x_{i-1,k-1}, z_{i-1,k-1}], \qquad (1)$$

where i=1, . . . , r, k=1, . . . , t, $f_0 = z_{i,0}$, $x_t \equiv x_0$ and $x_{t+1} \equiv x_1$, and $z_{i,0}, \ldots, z_{i,t}$ are the t bytes of the subkey $z_i$, which controls the i-th round, and wherein the functions $f_i, \ldots, f_{t-1}$ have the following form $$f_j = f(x_1 \oplus x_2 \oplus \ldots x_j \oplus z_j)$$

where j=1, . . . , t−1, and f: M?M, is said map derived from a chaotic map, $\oplus$ denotes an exclusive logical sum (XOR) or modulo two addition.

12. The method of claim 1 further comprising implementing at least one of said rounds, when converting said data signals from said unencrypted plaintext format to said encrypted ciphertext format, with at least one round module for encryption.

13. The method of claim 1 further comprising, for converting said data signals from said encrypted ciphertext format to said unencrypted plaintext format, providing at least one round module for decryption, said at least one round module for decryption including a plurality of sub-modules.

14. The method of claim 13 further comprising:
providing at least one first layer of logical gates affecting a bit-by-bit exclusive logical sum of the selected bits of said respective input data signals; and
providing a second layer including look-up table means addressed as a function of said round key.

15. The method of claim 1 further comprising providing a computer program product directly loadable into the internal memory of a digital computer including software code portions for performing the method of converting, when said product is run on a computer.

16. The method of claim 1, wherein said discrete map is a bijection.

17. A method of converting data signals between an unencrypted plaintext format and an encrypted ciphertext format, the method comprising a plurality of rounds effected on a respective set of input data signals to generate a respective set of output data signals by means of a transformation controlled by a round key, wherein said transformation is identified by means of at least one map function derived from a chaotic map and wherein said map function comprises an exponential function having an output range extended to a given interval and then discretized, said exponential function having a basis selected so that it is a natural number and a generator of the multiplicative group of nonzero elements of a Galois field of an order related to said interval.

18. A method of converting data signals between an unencrypted plaintext format and an encrypted ciphertext format, the method comprising a plurality of rounds effected on a respective set of input data signals to generate a respective set of output data signals by means of a transformation controlled by a round key, wherein said transformation is identified by means of at least one map function derived from a chaotic map and, wherein said at least one map function comprises:

defining a phase space and dividing such phase space into n+1 equal volume regions, assigning numbers 0, . . . , n to said regions so that one number is assigned to one region respectively, randomly choosing one starting point from each said region and determining an image thereof after a given number (n) of iterations of said chaotic map, finding a set of starting points having a unique image, choosing a subset containing a given number of elements of said set of starting points and determining a corresponding set of corresponding images, assigning new magnitudes to the elements of said subset as a function of their old magnitudes, assigning respective new magnitudes to the elements of said corresponding set of corresponding images as a function of their old magnitudes, and defining said function as equal to j, where i is the new magnitude of the starting point in said subset is i and the new magnitude of its image is j.

19. A method of converting data signals between an unencrypted plaintext format and an encrypted ciphertext format, the method comprising a plurality of rounds effected on a respective set of input data signals to generate a respective set of output data signals by means of a transformation controlled by a round key, wherein said transformation is identified by means of at least one map function derived from a chaotic map, wherein converting said data signals from said unencrypted plaintext format to said encrypted ciphertext format said transformation comprises:

$$x_{i,k+1} = x_{i-1,k} \oplus f_{k-1}[x_{i-1,1}, \ldots, x_{i-1,k-1}, z_{i-1,k-1}], \quad (1)$$

where i=1, . . . r, k=1, . . . , t, $f_0 = z_{i,0}$, $x_t \equiv x_0$ and $x_{t+1} \equiv x_1$, and $z_{i,0}, \ldots z_{i,t}$ are the t bytes of the subkey $z_i$, which controls the i-th round, and wherein the functions $f_i, \ldots f_{t-1}$ have the following form $$f_j = f(x_1 \oplus x_2 \oplus \ldots x_j \oplus z_j)$$

where j=1, . . . , t−1, and f: M?M, is said map derived from a chaotic map, $\oplus$ denotes an exclusive logical sum or modulo two addition and wherein when converting said data signals from said encrypted ciphertext format to said unencrypted plaintext format said transformation comprises:

$$x_{i-1,k} = x_{i,k+1} \oplus f_{k-1}[x_{i-1,1}, \ldots, x_{i-1,k-1}, z_{i-1,k-1}], \quad (2)$$

wherein $\oplus$ denotes an exclusive logical sum (XOR).

20. A method of converting data signals between an unencrypted plaintext format and an encrypted ciphertext format, the method comprising a plurality of rounds effected on a respective set of input data signals to generate a respective set of output data signals by means of a transformation controlled by a round key, wherein said transformation is identified by means of at least one map function derived from a chaotic map, wherein converting said data signals from said unencrypted plaintext format to said encrypted ciphertext format said transformation comprises:

$$x_{i,k+1} = x_{i-1,k} \oplus f_{k-1}[x_{i-1,1}, \ldots, x_{i-1,k-1}, z_{i-1,k-1}], \quad (1)$$

where i=1, . . . , r, k=1, . . . , t, $f_0 = z_{i,0}$, $x_t \equiv x_0$ and $x_{t+1} \equiv x_1$, and $z_{i,0}, \ldots, z_{i,t}$ are the t bytes of the subkey $z_i$, which controls the i-th round, and wherein the functions $f_i, \ldots, f_{t-1}$ have the following form $$f_j = f(x_1 \oplus x_2 \oplus \ldots x_j \oplus z_j)$$

where j=1, . . . , t−1, and f: M?M, is said map derived from a chaotic map, $\oplus$ denotes an exclusive logical sum (XOR) or modulo two addition and wherein said round subkey is derived from an encryption/decryption key ($K_0$) by means of the following relationship $$K_{i,k+1} = K_{i-1,k} \oplus f_{k-1}[K_{i-1,1}, \ldots, K_{i-1,k-1}, c_{k-1}],$$

$$z_i = RH(K_i).$$

where $k_{i,j}$ denotes the bytes of the keys and where i=1, . . . , r, k=1, . . . , 2t, $f_0 = c_0$, $K_{i,2t} \equiv K_{i,0}$ and $K_{i,2t-1} \equiv K_{i,1}$.

21. A method of converting data signals between an unencrypted plaintext format and an encrypted ciphertext format, the method comprising a plurality of rounds effected on a respective set of input data signals to generate a respective set of output data signals by means of a transformation controlled by a round key, wherein said transformation is identified by means of at least one map function derived from a chaotic map;

implementing at least one of said rounds, when converting said data signals from said unencrypted plaintext format to said encrypted ciphertext format, with at least one round module for encryption, wherein implementing at least one of said rounds further comprises:

providing a first layer of logical gates for effecting a bit-by-bit exclusive logical sum (XOR) of said respective input signals and said round key; and providing a second layer of look-up tables for implementing said at least one map function.

* * * * *